April 8, 1941.　　　　A. DEWANDRE　　　　2,237,930
GUN SUPPORT
Filed Oct. 4, 1937　　　8 Sheets-Sheet 3
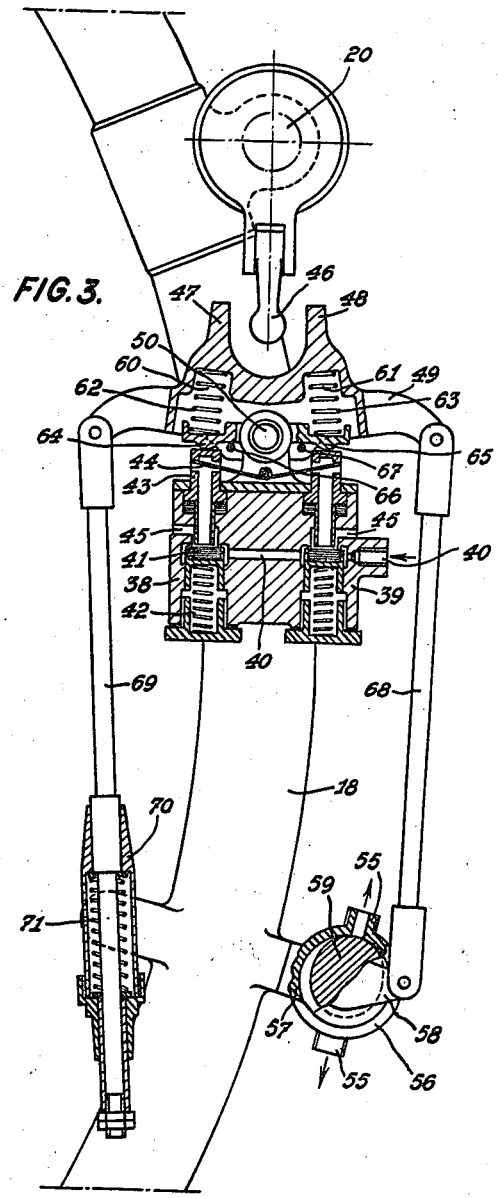
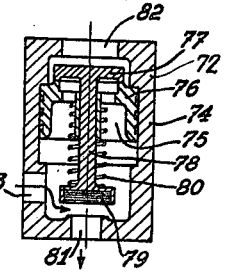
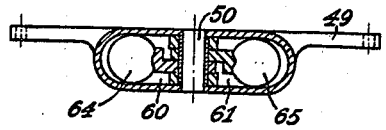

April 8, 1941.	A. DEWANDRE	2,237,930
GUN SUPPORT
Filed Oct. 4, 1937	8 Sheets-Sheet 4
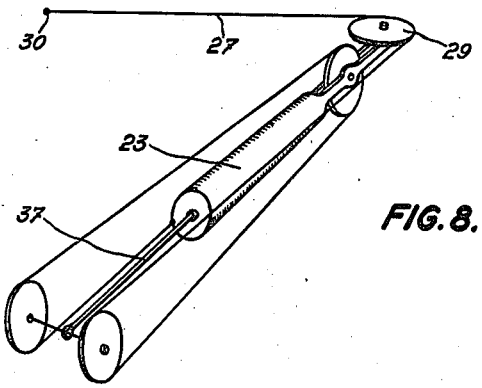
FIG. 8.
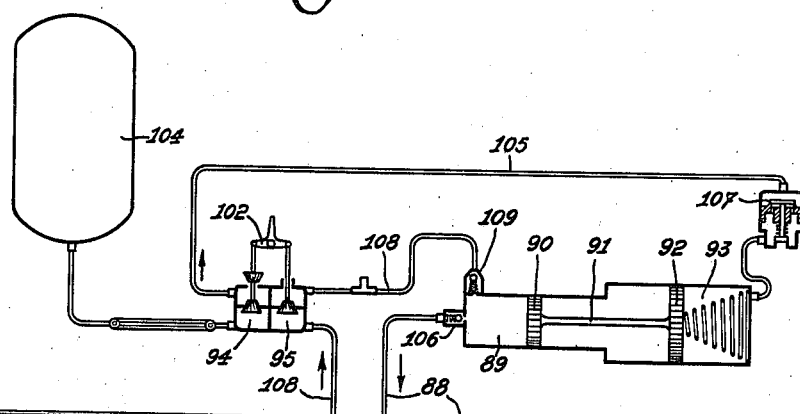
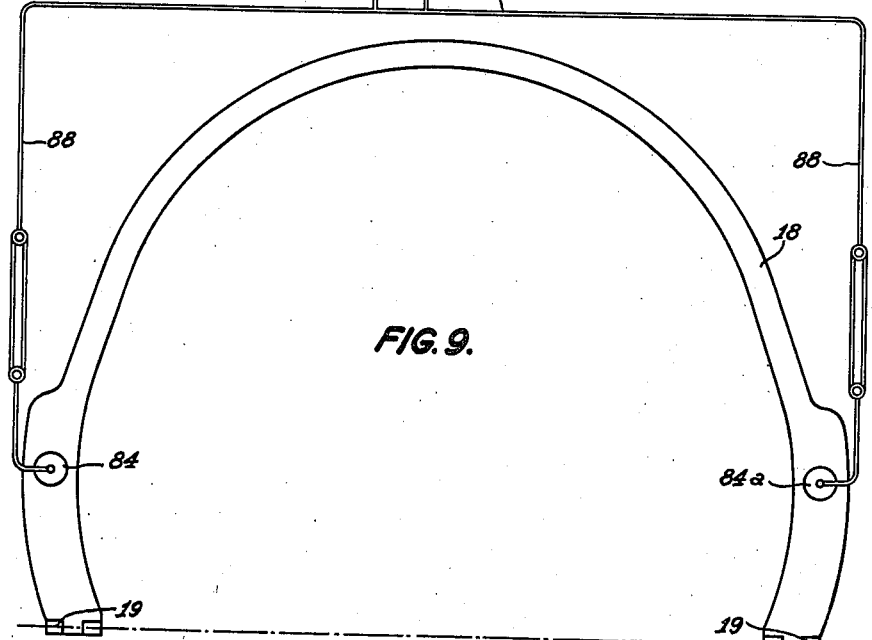
FIG. 9.
A. Dewandre Inventor
By Glascock Downing & Seebold Attys.

April 8, 1941. A. DEWANDRE 2,237,930
GUN SUPPORT
Filed Oct. 4, 1937 8 Sheets-Sheet 5

A. Dewandre
Inventor
By: Glascock Downing & Seebold
Attys.

April 8, 1941.  A. DEWANDRE  2,237,930
GUN SUPPORT
Filed Oct. 4, 1937  8 Sheets-Sheet 6

A. Dewandre
INVENTOR
By: Glascock Downing & Seebold
Attys.

April 8, 1941.   A. DEWANDRE   2,237,930
GUN SUPPORT
Filed Oct. 4, 1937   8 Sheets-Sheet 7
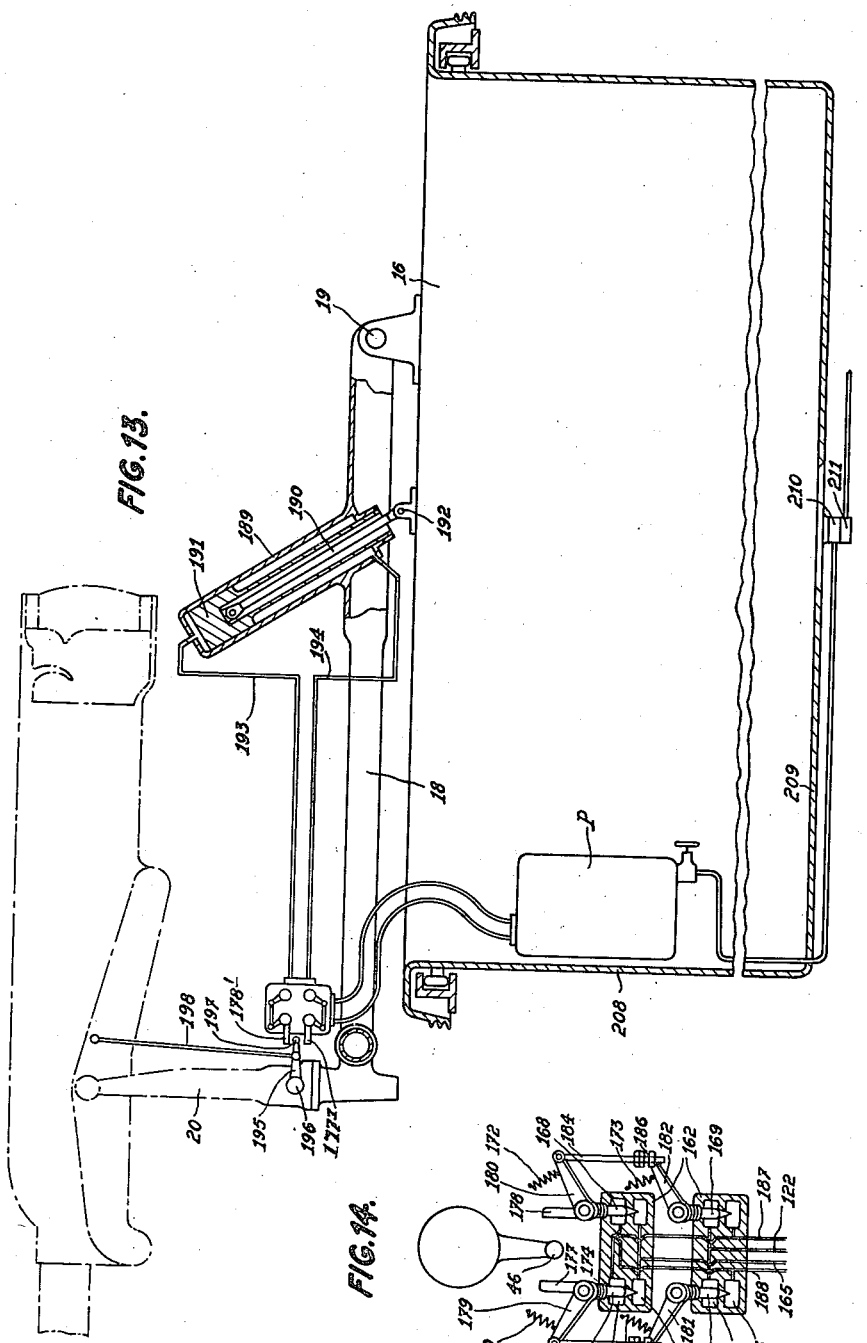

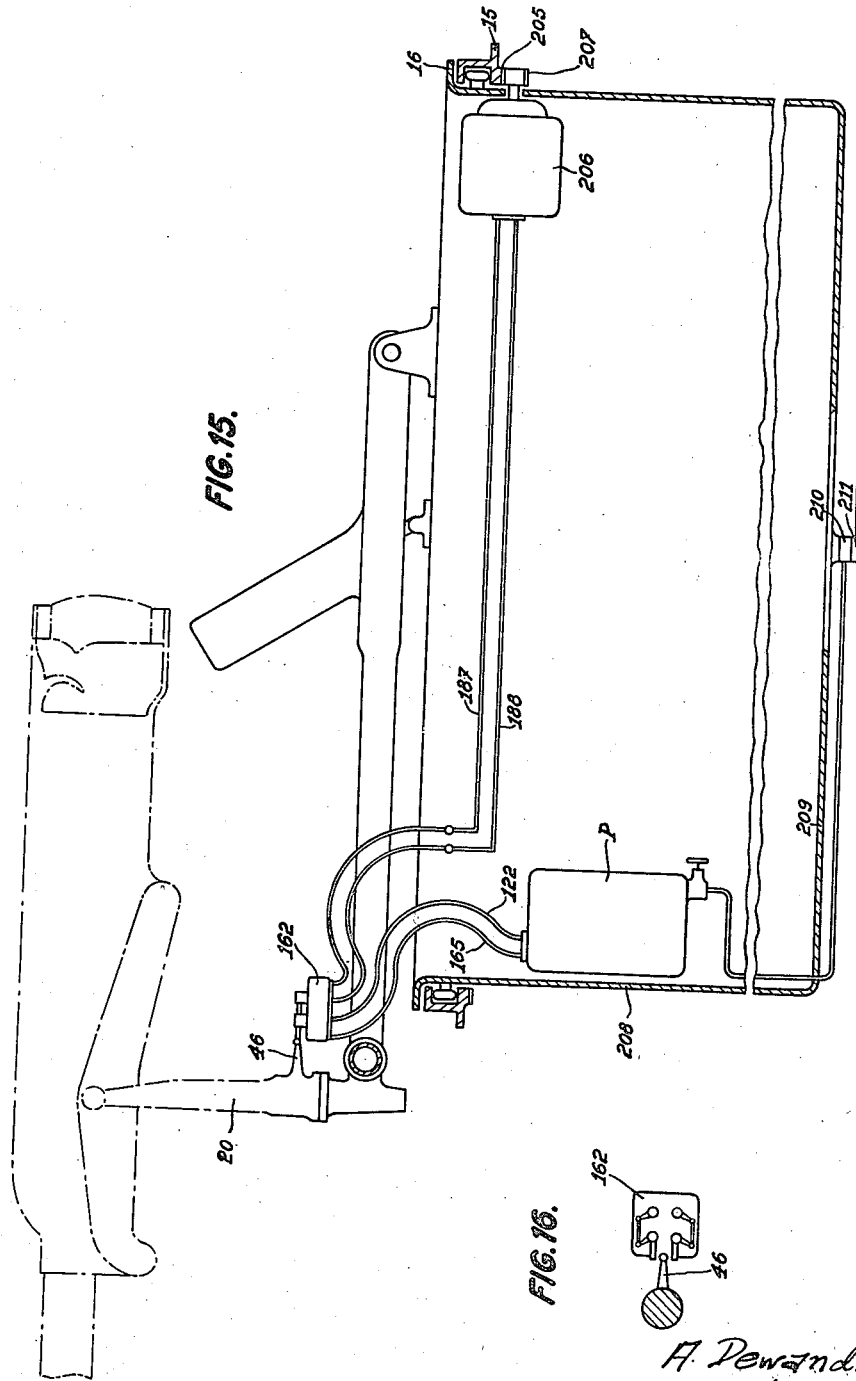

Patented Apr. 8, 1941

2,237,930

UNITED STATES PATENT OFFICE 2,237,930

GUN SUPPORT

Albert Dewandre, Brussels, Belgium, assignor to Servo-Frein Dewandre, Société Anonyme, Liege, Belgium Application October 4, 1937, Serial No. 167,312
In France October 8, 1936

4 Claims. (Cl. 89—37.5)

To enable a machine gun to be used on board an aeroplane, it is essential that the gun be allowed to perform rotary and elevatory movements, which should be effected easily, without imposing a considerable exertion upon the operator, inasmuch as the high speed of aeroplanes, which are besides subjected to the action of the wind, results in that the efforts the gun operator would have to make in order to overcome these resistances would render the operation of the gun laborious and difficult to him, more specially at high altitudes.

To materially reduce the operator's exertion, use may be made of a driving medium which may consist, inter alia, of compressed fluid, and the said fluid may be caused to act upon the various devices so as to effect the rotary motion of the gun support around an axis and the lifting motion of the said support above the horizontal. The two movements may be effected simultaneously.

My invention has for its object to provide a gun turret in which the rotary and elevatory movements of the gun operated by the gunner acting upon the gun proper are brought about by means of motors driven by fluid under pressure and which are automatically started by the action of the gunner.

According to my invention, rotary motion of the gun ring around its axis is performed by means of motors or drive devices acting under the effect of fluid under pressure and automatically operated when the gun is displaced laterally, the actuation of the said drive devices and their speed of operation depending upon the amplitude of the lateral displacements imparted to the gun, by the operator, with respect to the neutral position thereof.

On the other hand, lifting motion of the gun, which is supported upon an arch pivoted to the gun ring, is performed by hydraulic jacks communicating with a source of hydraulic fluid under pressure through interposed distributors automatically controlled by the relative movements of the gun with respect to the gun support, effected in the vertical direction.

My invention also comprises automatically controlled means for applying pressure to the liquid actuating the various hydraulic drive devices.

Various embodiments of the invention will be hereinafter described simply by way of example, with reference to the accompanying drawings, in which:

Fig. 3 is a diagrammatic part sectional view, drawn to a larger scale, of the mechanism adapted to produce the rotary motion of the gun ring around its axis as shown in Fig. 1;

Fig. 4 is a detail view of the mechanism shown in Fig. 3;

Figs. 5, 6 and 7 are sectional views of a quick-acting fluid escape valve of the device, showing different positions of the said valve;

Figure 2:
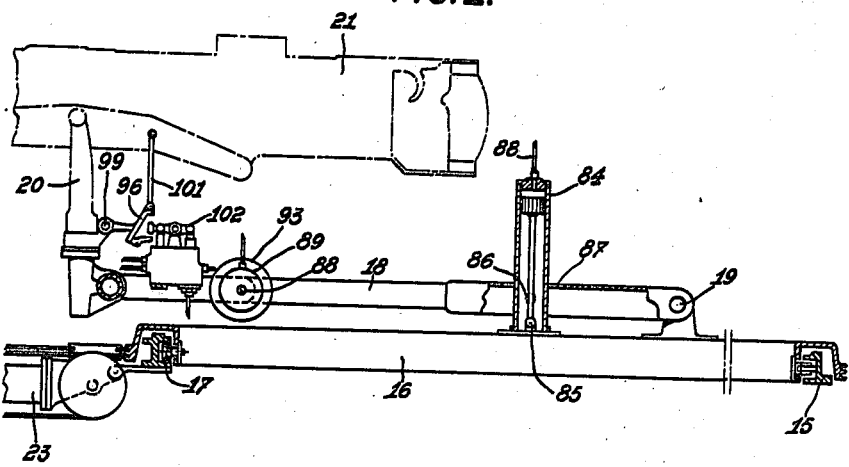
Fig. 2 is a diagrammatic section of the lifting mechanism for the arch supporting the gun, in accordance with the said embodiment of the invention.
Figure 10:
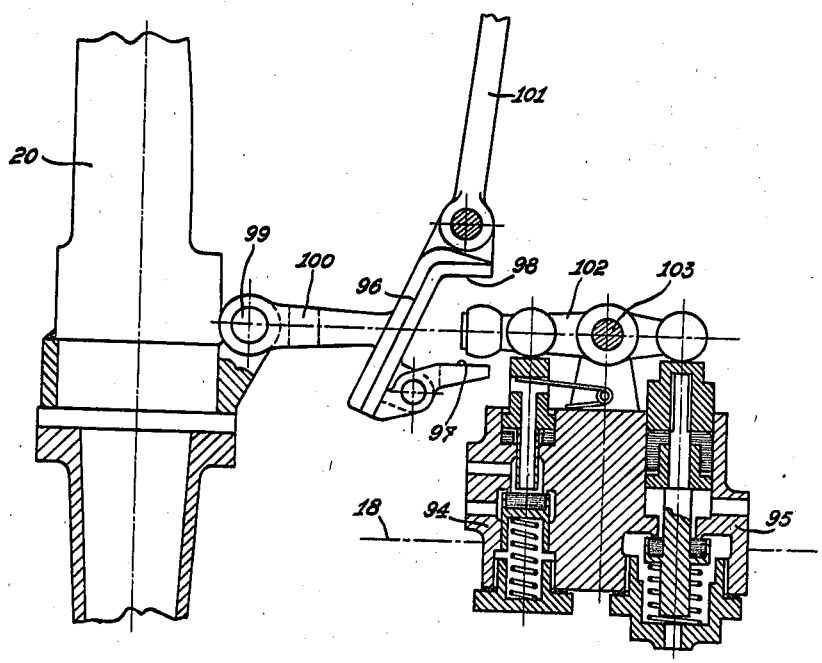
Figure 11:
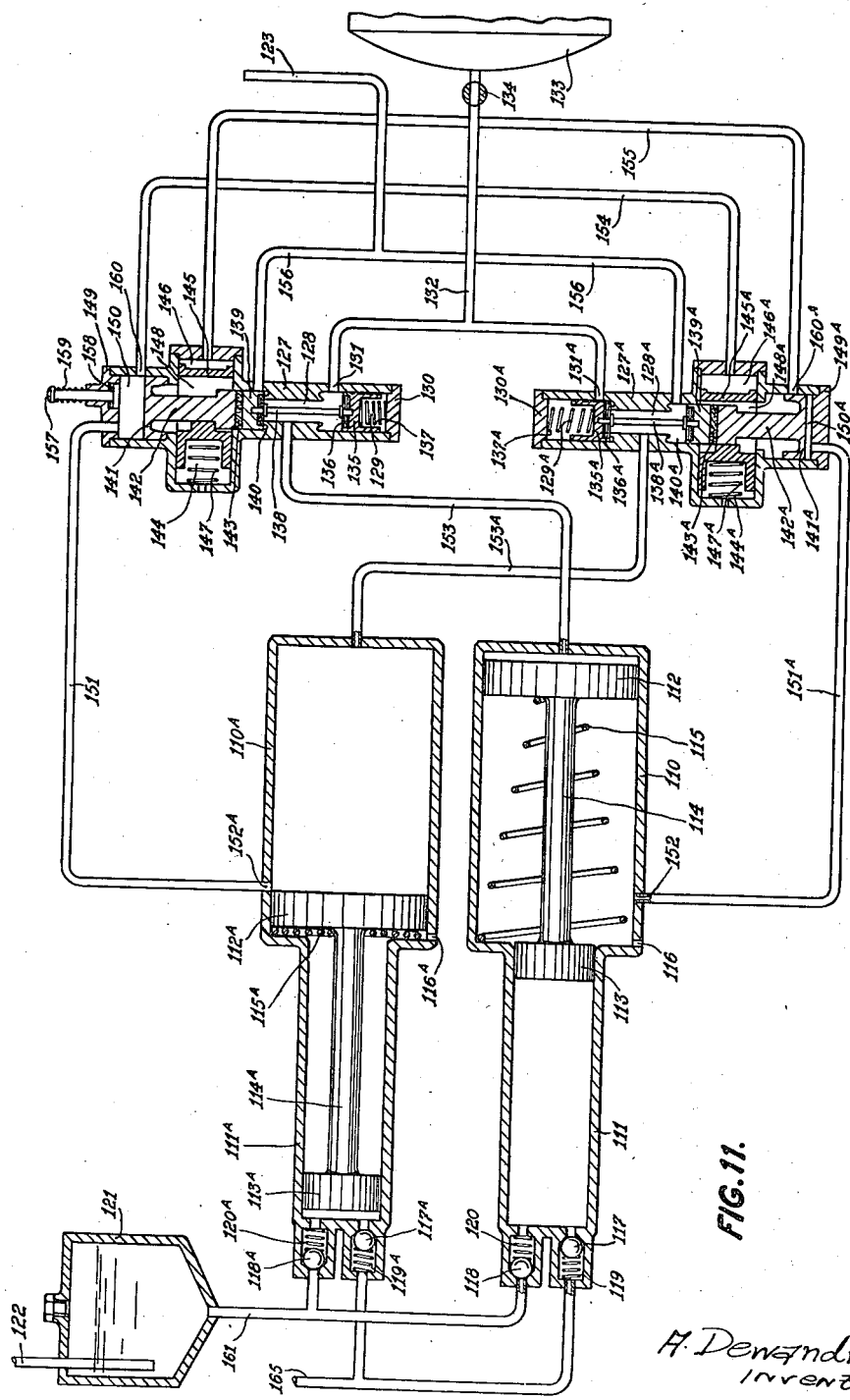
Figure 12:
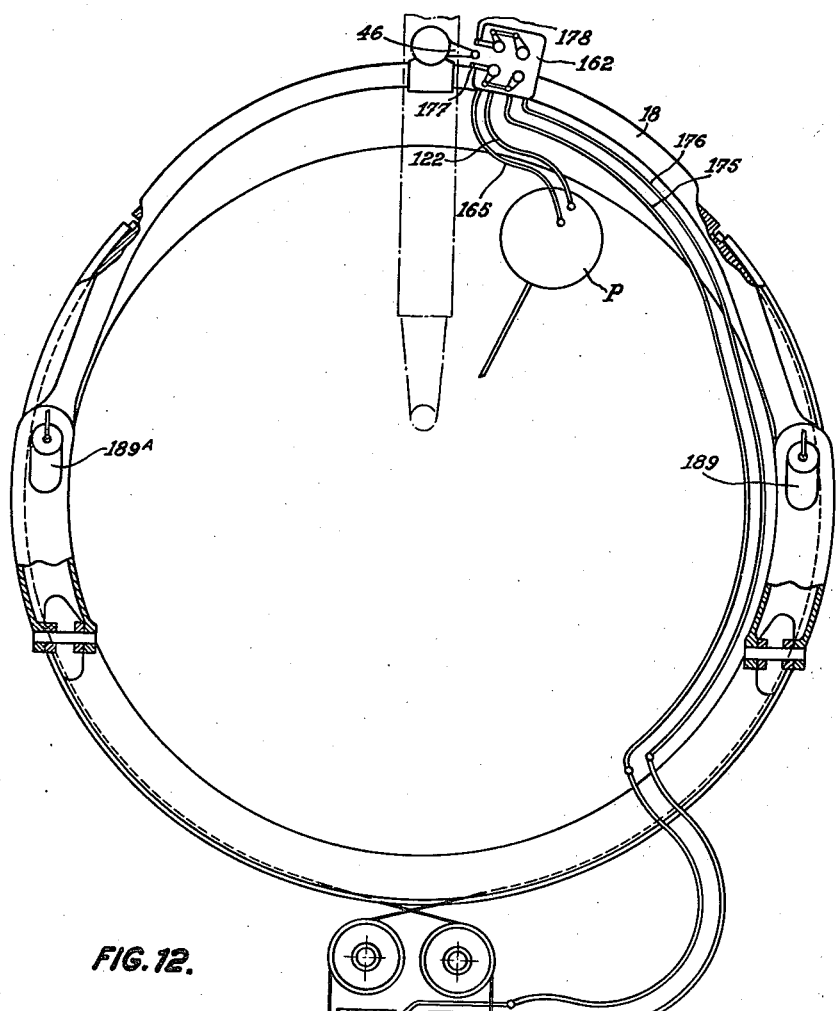

Fig. 8 diagrammatically shows a pulley system used to secure the required amplitude of angular displacement of the gun ring;

Fig. 9 diagrammatically illustrates the mechanism for controlling and raising the arch shown in Fig. 2;

Fig. 10 is a part sectional view, drawn to a larger scale, of the control system for the lifting mechanism of the arch according to Fig. 2;

Fig. 11 is a diagrammatic sectional view of the oleo-pneumatic pump as applied to a modified embodiment of the invention;

Fig. 12 is a diagrammatic plan view partly in section showing the arrangement of the means for operating the rotation of the gun ring by the action of oil under pressure.

Fig. 13 is a diagrammatic elevation of a modified embodiment of the arch lifting mechanism, comprising a distributing system for the oil under pressure;

Fig. 14 is a diagrammatic sectional view, drawn to a larger scale, of the distributor valve controlling the flow of oil under pressure in the rotating and lifting cylinders;

Fig. 15 is a diagrammatic view of a further modification of the rotating mechanism operated from a motor driven by oil under pressure;

Fig. 16 is a diagrammatic view partly in section of the valve controlling the supply of oil under pressure to the motor for rotating the gun ring.

Figure 1:
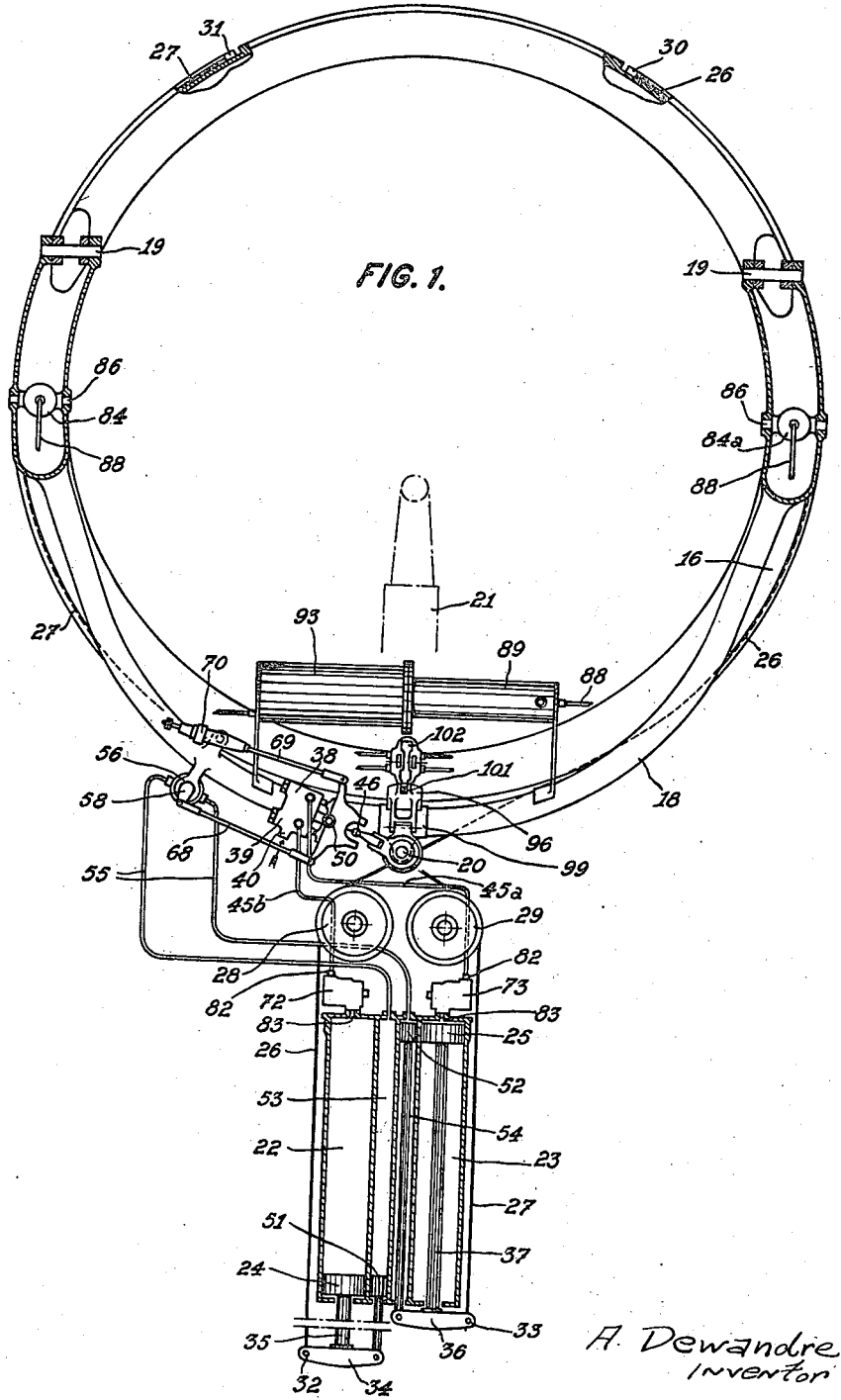
Fig. 1 is a diagrammatic plan view of a gun support comprising operating means according to one embodiment of the invention.

As shown in Figs. 1 and 2 of the drawings, the gun support comprises a fixed circular portion 15 secured to the aeroplane and a movable portion 16 diametrically and horizontally guided by means of rollers 17, as is known per se in the construction of turntables.

Pivotally mounted about the central portion of an arch 18—which is in turn pivoted at 19 to the movable part 16 of the gun support—there is a fork 20 universally supporting the gun 21.

Two drive cylinders 22 and 23 made rigid with the fixed part 15 of the gun support are adapted to act each separately to impart to the movable member 16 a rotation in either direction under the effect of the movement of the pistons 24 and 25 mounted in the said cylinders and through the medium of a combined system consisting of cables 26 and 27 and pulleys 28 and 29.

The said cables are guided in grooves formed on the periphery of the movable member 16, each cable having one of its ends secured to the said movable member at 30 or 31 respectively, while the other ends of the cables are secured one, at 32, to a member 34 provided at the end of the piston rod 35 of the piston 24, and one, at 33, to a member 36 provided at the end of the piston rod 37 of the piston 25.

To obtain a sufficient amplitude of angular movement of the gun ring while avoiding the use of drive cylinders of impractical length, the invention provides increasing the amplitude of the peripherical movement of the gun ring with respect to the amplitude of the longitudinal movement of the piston of the drive device by means of a pulley system interposed in the path of the cable and consisting of pulleys, part of which are pivoted to the end of the piston rod, and part to the drive cylinder (Fig. 8).

To control the motor cylinders there are provided two twin distributors 38 and 39 supported by the arch 18 and adapted to put in communication the drive cylinders 22 and 23 with the compressed air supplied from a reservoir (not shown) and entering the said distributors through the duct 40.

Each distributor comprises a valve 41 normally applied on its seat by the action of a spring 42 and actuated by the longitudinal displacements of a hollow stem 43 movable against the opposing action of a spring 44 so as to drive back the said valve thus opening the communication between the fluid supply duct 40 and the discharge orifice 45 of the fluid to the drive cylinder.

A pipe 45a connects the distributor 38 with the cylinder 23, while a pipe 45b connects the distributor 39 with the cylinder 22.

The distributors 38 and 39 are operated by the relative displacements of the gun with respect to the axis of the fork 20.

To this end, the said fork is fitted laterally with a finger 46 the end portion of which is movable, with a convenient play, between the limbs 47 and 48 of a U-shaped member integral with a rocking lever 49 pivoted on the said distributors at 50.

It will be easily understood that every time the gunner imparts to the butt of the gun a lateral movement of convenient amplitude in the one or the other direction, this will be effective in displacing the finger 46 in the same direction, which finger will act so as to rock the lever 49 with a resulting actuation of the one or the other distributor, thus opening the communication between the source of fluid and one of the drive cylinders.

However, a device so designed would not be capable of securing the required accuracy in the displacements of the gun ring, as regards both the quick displacements of great amplitude and the small displacements.

According to the invention, the required precision is obtained by arranging the drive pistons 24 and 25 so that they move in one with two pistons 51 and 52 mounted to slide in cylinders 53 and 54 respectively. The latter cylinders are connected with each other through a pipe 55, and the chamber thus constituted between the faces of the two pistons 51 and 52 is filled with oil.

The pipe 55 has interposed in it a throttle valve 56 supported on the arch 18 and adapted, according to its position, to cut off or to regulate the flow of oil caused to pass from one cylinder to the other when the pistons 51 and 52 move in opposite directions.

The valve 56 may be of any suitable construction or may consist for instance of a body 57 having mounted therein an eccentric plug 59 movable through the medium of a lever 58, the said plug being adapted, when in the normal position, to close one of the oil admission or escape apertures, while, in moving in the one or the other direction, the said plug progressively uncovers the said aperture.

The valve 56 is operated from the movements of the rocking lever 49 and, to this end, the invention provides for means whereby the operation of the said valve is caused to slightly lag behind the opening of the distributor 38 or 39.

The retarding means consist in forming the lever 49 with recesses 60 and 61 having inserted therein springs 62 and 63 acting upon brackets 64 and 65 pivoted to the fulcrum 50 and having the extent of their movement limited by pins 66 and 67.

Owing to this arrangement, every time the lever 49 will be rocked around its spindle 50 this will be effective first in actuating one of the distributors 38 or 39—inasmuch as the elastic resistance of the springs 62 and 63 is greater than the combined elastic resistance of the springs 42 and 44—and further, in opening the throttle 56 through the medium of the link 68 pivoted at one end to the lever 49 and at the other end to the lever 58.

Thus, when one of the distributors is opened as a result of an initial lateral shift of the gun around its pivotal axis, no movement of the gun ring will take place, considering that the valve 56 will still remain closed. The communication between the two oil cylinders 53 and 54 will not be opened unless an additional lateral impulse is imparted to the gun. The greater the extent of lateral shift of the gun with respect to its support, the greater the cross area of oil flow and, consequently, greater the speed of movement of the gun ring.

To secure the closure of the valve 56 after the gun has returned to its neutral position, the lever 49 is connected through a rod 69 to a drive back system 70 comprising a neutraliser spring 71 and acting so as to move back the distributors and the said valve to their respective positions of rest and to keep them in these positions under a certain bias.

To allow the rotary motion of the gun ring to be suddenly reversed, the invention makes provision of quick discharge valves 72 and 73 each mounted at the intake aperture of the drive cylinders which are shown in detail in Figs. 5 to 7.

Each of the said valves consists of a casing 74 comprising a cylindrical chamber 75 having mounted therein a piston 76 capable of a limited sliding stroke.

The head of the piston 76 bears a valve member 77 the stem 78 of which is guided axially in the said piston and carries at its lower end a second valve member 79, the valve member 77 being normally applied on its seat by a spring 80.

When in the inoperative position, the valve member 79 closes an aperture 81 provided for the escape of fluid to the atmosphere and formed in the casing 74. The latter also comprises an aperture 82 connected with the fluid supply pipe, and an aperture 83 communicating with the chamber formed inside the corresponding drive cylinder.

The inoperative positions of the valve members 77 and 79 is shown in Fig. 5. When fluid under pressure controlled by the twin distributors 38—39 is admitted, the pressure exerted by the fluid acts upon the piston 76 and pushes the latter away, thus opening the communication between the fluid supply pipe and the interior of the drive cylinder (Fig. 6).

When the pressure is relieved in the fluid supply pipe the piston 76 is returned by the action of the air under pressure contained in the drive cylinder and takes with it the valve members 77 and 79, thus uncovering the aperture 81 with a resulting quick escape of the air under pressure to the atmosphere (Fig. 7).

To produce the angular displacements of the arch 18 (Fig. 9) around the fulcrums 19 provided at the movable part 16 of the gun turret, thus allowing the gun to be raised and lowered, the invention provides two hydraulic jacks 84 and 84a pivoted at the one hand, at 85, to the movable part 16, and on the other hand, at 86, to the arch 18, in a recess 87 provided in the latter.

The said jacks are connected through a pipe 88 with the discharge of an oil pump 89 comprising a piston 90 the piston rod 91 of which is operated by a further piston 92 slidably mounted in a drive cylinder 93 and actuated by compressed air.

The operation of the pump 89 is controlled by a compressed air distributor 94 similar to the distributors 38 and 39, the distributor 94 being supported by the arch 18 and coupled with a valve 95 controlling the blow-off from the jacks 84, 84a and the re-flow of oil to the cylinder of the pump 89.

The distributor 94 and the valve 95 are automatically operated when a relative vertical motion is imparted to the gun with respect to its support. To this end, a recessed member 96 (Fig. 10), provided inside with two abutment surfaces 97 and 98, is pivoted at 99 to the end of a projection 100 extending from the said member 96.

The member 96 is caused to move angularly around its pivotal center 99 when the gun is displaced vertically, the member 96 being connected to the said gun by means of a link 101.

When thus moved angularly, the member 96 comes to act upon one of the ends of an oscillating lever 102 pivoted at 103 to the control distributor, so as to open the air distributor 94 when the butt end of the gun is being lowered with the object of raising the barrel. Opening the distributor 94 is effective in establishing the communication between the source of compressed air 104 (Fig. 9) and the cylinder 93, through a pipe 105.

Under the action of the compressed air, the piston 92 is caused to move and takes with it the piston 90 which forces the oil from the cylinder 89 into the jacks 84 and 84a, thus causing the arch 18 to rise.

As soon as the line of sight is reached, slightly raising the butt of the gun will be effective in allowing the rocking lever 102 to return to its normal position, while at the same time the upward movement of the arch will be arrested, and the said upward movement can not be taken up again unless the butt of the gun is again lowered.

To prevent the oil which has been forced into the jacks from being forced back into the oil pump, under the effect of the weight of the gun, when the air pressure is relieved from the piston 92, provision is made of a check valve 106 interposed in the pipe 88, at the discharge orifice of the pump 89.

When the distributor 94 is closed, the air contained in the cylinder 93 is allowed to escape through a quick discharge valve 107 similar to the valves 72 or 73.

To produce the downward movement of the arch, all that need be done is to raise the butt of the gun—thus lowering the barrel—which will be effective in rocking the lever 102 by means of the link 101 and the member 96, with the result that the valve 95 will be opened and the oil contained in the jacks will return to the pump 89 through the pipe 108 which has interposed therein, at 109, a check valve adapted to prevent the oil from passing through the said pipe when the pump 89 is operated.

The rotary movement of the gun ring and the upward and downward movements of the arch may be simultaneously produced by the operator in imparting to the butt of the gun an oblique movement so as to simultaneously act upon the two rocking levers 49 and 102.

In the above described embodiment the rotary as well as the elevatory movements of the gun involve—whatever be the amplitude of such movements—a complete filling up of the cylinders working on compressed air, while, when the movement concerned is arrested, the compressed air is to be completely drawn off from the said cylinders. Consequently, the device, when so designed, results in a high consumption of compressed air for a series of small displacements. The quantity of air thus consumed is not a function of the displacements of the gun ring.

To reduce the said air consumption so that it be exactly proportional to the movements imparted to the gun, a modified embodiment of the invention may be designed, in which the driving medium used for rotating and raising the gun support members consist of oil put under pressure by means of an automatically operated oleopneumatic pump.

According to the modified embodiment, the oil under pressure is delivered through the pump shown in Fig. 11, in which 110 and 110A indicate the compressed air cylinders. Forming extensions of the cylinders 110, 110A, there are provided two cylinders 111 and 111A in which the oil is set under pressure. In each pair of cylinders 110—111 and 110A—111A there is slidably mounted a pair of pistons 112—113 or 112A—113A, the pistons of each pair being interconnected by piston rods 114 and 114A respectively. The said pistons are urged to their respective positions of rest by means of the springs 115 and 115A. That portion of the cylinders which is comprised between the pistons 112 and 113, and 112A and 113A is constantly in communication with the atmosphere through the apertures 116 and 116A.

At the bottom of the cylinders 111 and 111A there are provided balls or valve members 117—118 and 117A—118A, which are applied against their seats by springs 119—120 and 119A—120A. An oil tank 121 is adapted to collect the re-flow oil discharged through the pipe 122. On the other hand, the compressed air from the cylinders 110 and 110A is allowed to escape to the atmosphere through the pipe 123. To assist the oil in entering the cylinders 111 and 111A, air pressure is formed initially above the oil level in the upper portion of the tank 121, which thus acts as an air chamber, and the said pressure may be automatically maintained by any convenient means.

The compressed air distributors are of the type disclosed in United States patent application Serial 124,096 and consist of castings 127, 127A formed inside with chambers 128, 128A provided with extensions which constitute cylinders 129, 129A sealed at their outer ends by plugs 130 and 130A and communicating through apertures 131 and 131A with a pipe 132 connected with the source of compressed air or tank 133. The flow from the said source may be shut out by means of a cock 134 interposed in the pipe 132.

In the cylinders 129 and 129A there are slidably mounted valve members 135 and 135A carrying each on its head a packing 136, 136A of elastic material. The valve members 135, 135A are applied against their respective seats by the springs 137, 137A and by the pressure of the compressed air flowing along the said valve members. Stems 138 and 138A secured axially in the heads of the valve members 135 and 135A extend across the chambers 128 and 128A and are connected to valve members 139 and 139A arranged to slide in bores 140 and 140A provided in line with, and forming extensions of the chambers 128 and 128A. The valve members 139 and 139A are connected to pistons 141 and 141A by means of rods 142 and 142A and through the medium of elastical washers 143 and 143A.

In bores 144 and 144A situated at right angles to the casings 127 and 127A of the distributors and extending from one side to the other of the said casings, there are slidably mounted bolts 145 and 145A, one end of the said bolts being subjected to the action of the compressed air in the chambers 146 and 146A, and the other end to the opposing action of the springs 147 and 147A. The bolt members are formed each with a restricted portion, the latter portions being provided with openings 148 and 148A arranged to allow the valve members 139 and 139A to pass therethrough.

Plugs 149 and 149A are adapted to seal the ends of the casings 127 and 127A and to form chambers 150 and 150A. These chambers are connected through pipes 151 and 151A with the apertures 152 and 152A provided in the compressed air cylinders 110 and 110A and so arranged as to be uncovered, one at a time, every time one of the pistons 112 or 112A reaches the left hand end (Fig. 11) of its stroke. The chambers 128 and 128A are connected to the bottoms of the cylinders 110 and 110A through pipes 153 and 153A, respectively.

Moreover, the chamber 150 is connected with the chamber 146A through the pipe 154, while the chamber 146 is connected with the chamber 150A through the pipe 155. Finally the chambers 140 and 140A communicate with each other through the pipe 156, which is in turn connected with the pipe 123 for the escape of compressed air.

The plug 149 has slidably mounted therein a push button 157, and the end of the said push button protruding into the chamber 150 carries a valve member 158 which is applied against its seat by the spring 159. The push button 157 is intended for effecting the initial start of the device.

The operation of the device is as follows:
When the device is in the position illustrated in the diagrammatic Fig. 11, the air under pressure flows out of the tank 133 through the pipe 132 and enters the chambers 129 and 129A through the apertures 131 and 131A. The valve member 135A being applied on its seat, the compressed air is retained in the chamber 129A.

The compressed air flows across the chambers 129, 128, passes through the pipe 153 and enters the chamber inside the cylinder 110 where it acts upon the piston 112. The latter piston, by means of the rod 114, takes with it the piston 113, which in turn acts upon the oil contained in the cylinder 111. As soon as the oil is forced out it lifts the ball 117 and flows to the drive devices.

While the piston 113 is moving to the left, the pistons 113A and 112A are returning to the right under the action of the return spring 115A and the cylinder 111A is filled up, through pipe 161, with oil from the oil tank, which oil is drawn into the said cylinder with the assistance of the pressure exerted upon the surface of the oil contained in the said tank. The compressed air escapes from the cylinder 110A through the pipe 153A, the chambers 128A and 140A and the pipes 156 and 123.

When the piston 112 reaches the left hand end of its stroke, the aperture 152 is uncovered and the compressed air passes through the pipe 151A into the chamber 150A of the distributor. At this moment the piston 141 is moved under the action of the compressed air and applies the valve 139A on its seat. Hence, the port 160A is uncovered and the compressed air flows through the pipe 155 and enters the chamber 146 so as to act upon the bolt 145, thus freeing the valve 139 which is therefore lifted from its seat under the action of the spring 137. At the same time, the valve 136 is applied against its seat and cuts off the flow of compressed air to the cylinder 110.

On the other hand, the action of compressed air upon the piston 141A has been effective in applying the valve 139A on its seat and in opening the valve 136A, thus putting the source of compressed air in communication with the cylinder 110A the piston 112A of which has previously returned to the right hand end of its stroke.

It will be seen that the pressure is not relieved when the flow of compressed air is reversed.

Thus, the compressed air from the reservoir 133 enters the cylinder 110A through tube 132, port 131A, chambers 140A, 128A and pipe 153A. At the same time, the air from the cylinder 110 escapes through pipe 153, chambers 128, 140 and the pipes 156 and 123 opening to the atmosphere.

On the other hand, oil from the oil tank enters again the cylinder 111 through the pipe 161 in lifting the ball 118.

When the piston 112A reaches the left hand end of its stroke, the port 152A is uncovered and the compressed air flowing out through the said port is effective in starting the action of the distributors with the view of re-opening the communication between the cylinder 110 and the source of compressed air, in accomplishing the functions above described. The reciprocation of the pistons in their respective cylinders is thus obtained automatically, and consequently, the oil pressure required for the drive devices always available, inasmuch as there is at any moment one cylinder under air pressure. On the other hand, when one of the pistons has reached the end of its operative stroke the other piston will start its operative stroke, even if the latter piston has not yet reached the end of its return stroke.

In the second modification (Figs. 12 and 14) the power medium used is oil under pressure delivered from the oleo-pneumatic pump above described or from any other pump device. To control the drive cylinders, provision is made of a combined distributor 162 comprising four needle valves and supported by the arch 18, the said distributor being adapted to open the communiwith the delivery of oil under pressure conveyed from the pump P to the distributor 162 through a pipe 165.

The distributor 162 comprises four needle valves 166, 167, 168, 169 normally applied on their seat by the action of springs 170, 171, 172, 173. The said needle valves are formed with a threaded portion 174 which, upon rotary motion imparted to the needles, acts so as to allow the progressive opening or closure of the communication with the pump, through delivery pipe 165, and of the communication with the oil tank 121, through re-flow pipe 165.

Two pipes 175 and 176 are provided to connect the distributor to the drive cylinders 163 and 164, respectively.

The distributor is operated, as in the preceding embodiment, by the relative displacements of the gun about the axis of the fork 20. To this end, the finger 46 of the fork 20 may be arranged to be movable, with a certain play, between the arms 177 and 178 of two levers rigidly secured to the needle valves 166 and 168. The arms 179 and 180 of the said levers are connected by links 183 and 184 to levers 181 and 182 rigidly secured to the needle valves 167 and 169. The actuation of the needle valves 167 and 169 may be arranged to slightly lag behind the opening of the needle valves 166 and 168, owing to the back lash 185 and 186 provided between the top ends of the levers 181, 182 and adjustable stops secured to the links 183 and 184.

Every time the finger 46 is shifted laterally this will result in rocking the lever and link assembly 179, 183, 181 or 180, 184, 182 which in turn will be effective in opening the communication between the source of oil under pressure and one of the drive cylinders through the pipe 187, on the one hand, and in opening the communication between the other drive cylinder and the oil tank through the pipe 188, on the other hand.

To produce the angular movements of the arch 18 about the fulcrums 19 provided at the movable part 16 of the support and to enable the gun to be raised and lowered at will, provision is made, in accordance with the embodiment last referred to (Fig. 13), of two hydraulic jacks 189 and 189A, said jacks being integral with the arch, and the piston rod 190 of the piston 191 of each jack being pivoted at 192 to the movable part 16 of the support.

The upper surface of the piston 191 is in communication, through pipe 193, with the distributor controlling the raising movement of the arch, while the lower face of the said piston is connected with the same distributor through the pipe 194.

The distributor controlling the elevatory motion of the arch is identical to the distributor of Fig. 14 above described. The pipes 187 and 188 conveying oil under pressure to the drive cylinders for rotating the gun ring are now replaced by the pipes 193 and 194 which supply oil under pressure to the jacks adapted to raise and to lower the arch. The device according to the invention therefore comprises two distributors identical to that described with reference to Fig. 14.

The distributor controlling the lifting movement is automatically operated when the gun is displaced with respect to its support. To this end, a lever 195 pivoted to the fork 20 at 196 is provided with a finger 197 which is movable between the levers 177' and 178' of the distributor.

The finger 197 is angularly displaced with respect to its fulcrum point 196 when the gun is shifted vertically, the lever 195 being connected to the said gun by a link 198. When moved, the finger 197 comes to act upon the lever 177' and 178', which levers are rigidly secured to the needle valves of the distributor, the said action being effective in opening the communication between the source of oil under pressure and either of the faces of the piston 191 of the jack 189 through one of the pipes 193 or 194.

When one face of the piston 191 is in communication with the source of oil under pressure, the other face thereof is in communication with the tank 121 from whence the oil is re-circulated by the pump—as is the case in the drive cylinders operating the rotary movement of the gun ring.

The operation of the device is as follows:

When it is desired to rotate the gun ring to the right, that is to say in a clockwise direction, the operator imparts to the gun a pivotal movement in that direction, which results in displacing the finger 46, and the latter, in abutting the lever 177', opens the valve needles 166 and 167, thus establishing the oil circuit through pipe 165, chambers 199, 200 and pipe 187, and the oil enters the drive cylinder 163. At this moment the pressure of the oil acts upon the piston 201 which effects the rotation of the gun ring through the cable 202.

At the same time, the oil from the drive cylinder 164 flows back to the reservoir 121 through pipe 188, chambers 203, 204 and pipe 122. To arrest the rotation of the gun ring, the operator stops pushing the gun and the needle valves 165 and 167 are closed again under the action of the return springs 170 and 171.

To perform a left hand rotation, the operator acts upon the gun so as to operate the valve needles 168 and 169, and the functions described in connection with the right hand rotation will be repeated.

The raising and lowering of the arch is obtained by shifting the gun in the vertical plane. To raise the arch, the operator points the barrel of the gun upwards, which is effective in actuating the distributor in charge with the raising in such a manner as to open the oil circuit between the pump and the lifting jacks. To lower the arch, the operator acts upon the gun so that the barrel is pointed downwards. The oil is then circulated in the manner described above with reference to the rotary movement of the gun ring.

The rotation of the gun ring and the raising and the lowering of the arch may be effected simultaneously by the operator, as is the case in the first embodiment.

A third embodiment (Fig. 15) consists in that the rotation of the gun ring may be obtained from a volumetric motor operated by oil under pressure delivered by the pump.

To this end, the fixed circular part 15 of the gun support is fitted with a ring gear 205. The movable part 16 of the gun turret has fixed thereto a motor 206 of a well known suitable reversible type, which is operable by oil pressure. The shaft of the said motor has keyed thereon a pinion 207 adapted to mesh with the ring gear 205. The motor 206 is connected with the distributor 162 through pipes 187 and 188.

To produce the rotation of the support 16, the operator acts upon the gun in order to move the finger 46, thereby actuating the needle valves with the object of establishing the circuit of the oil under pressure between the pump and the motor 206 through pipe 165, distributor 162, pipe 187, motor 206, re-flow pipe 188, distributor 162, pipe 122, and back to the tank 121. To arrest the movement of the support, the operator stops acting on the distributor 162. To rotate the turret in the opposite direction, the operator acts upon the second needle valve assembly, and the oil is circulated through the above circuit in a direction, opposite to that above described, with a corresponding direction of movement of the motor 206.

In the arrangement illustrated in Figs. 12—13—15, the pump P is provided on a frame 208 integral with the movable part 16. The bottom of the frame may be furnished with a floor 209 for the operator. Under the floor there is provided a rotatable socket joint 210 which may be connected to a pipe conveying air under pressure from a reservoir.

The lower portion 211 of the interposed socket joint may be pivotally mounted with respect to the upper portion thereof, which is secured to the underside of the floor of the support. Owing to this arrangement, the compressed air cylinders of the pump may be connected with the source of compressed fluid by means of rigid pipes.

Of course, the pump may be located at any point of the aeroplane, in which case the connections will consist in flexible pipes.

This applies also, in the case of Fig. 15, to the motor 206 operating the rotary movement of the gun support. The motor 206 may be mounted on the fixed part 15, and the ring gear may be rigid with the circular movable part 16.

Instead of being produced from the relative movements imparted to the gun with respect to its support, the vertical and horizontal displacements of the said gun may be obtained by the aid of a lever independent on the gun and which may be caused to perform the same movements as that imparted by the operator to the butt of the gun.

In such an arrangement, the trigger of the gun can be connected through a flexible transmission device to an operating member provided on the said lever.

Of course, any one of the rotating devices or of the raising devices according to the invention may be used independently, it is to say, that any desired gun ring rotating system may be combined with one of the arch raising systems above described, while, on the other hand, one of the above described systems for rotating the gun ring may be combined with any desired arch raising system.

It will be understood that the oleo-pneumatic pump device above described makes it possible to obtain very high ratios of pressure transformation, and owing to this feature the apparatus used to produce the various movements of the gun turret will be of very reduced volume and weight.

Moreover, the oleo-pneumatic pump system may be applied in any other plant using compressed air as power medium.

What I claim is:

1. A gun support comprising a fixed ring, a movable ring turning on the said fixed ring and a gun pivoted to the said movable ring, two compressed air driving cylinders, a movable member in each of said cylinders, two oil cylinders each of which is arranged parallel to one of said air cylinders, a movable member in each of said oil cylinders, each of the latter members being connected to one of the movable members of the air cylinders, cables attached to said movable ring for being controlled by the said movable members and for turning the said movable ring in opposite directions, guiding pulleys for the said cables, means for amplifying the angular displacement of the said ring relatively to the displacement of the said movable members, a conduit connecting the two oil cylinders, a valve for regulating the section of passage in the said conduit, means depending on the lateral displacement of the gun relatively to its support for controlling the air distributors and then the oil valve and for varying the speed of movement of the said movable members by reason of the lateral angular displacements of the said gun.

2. A gun support according to claim 1, characterized by the means provided for controlling the air distributors and then the oil valve by the lateral displacemnts of the gun on its support comprising an air distributor for each of the driving cylinders, an oscillating lever for alternately controlling one of the said air distributors, a fork on the said oscillating lever, a pivoted support for the gun, means on the pivoted support for engaging the said fork with play, means including springs for maintaining the said lever in its normal position, a cylindrical shell for the oil valve, two diametrically opposed openings communicating with the cylindrical wall of the said shell, conduits for establishing the communication of each of said openings with one of the oil cylinders, an eccentric plug in the said shell for normally closing one of the said openings, a lever provided on the said plug for being controlled by the said lever oscillating in the two directions of the angular movement of the latter under the action of the lateral displacements of the gun.

3. A gun support according to claim 1, characterized by means for turning the movable ring in opposite directions by the displacement of movable members of pneumatic motors comprising guiding pulleys supported respectively by the air cylinders and by the movable members of the said cylinders, cables for cooperating with the said pulleys and for being fixed at one of their ends to one of the said air cylinders and by their other end at a point of the external cylindrical face of the said movable circle, and channels in said cylindrical face for guiding each of said cables on an opposite side of said ring.

4. A gun support comprising a fixed ring, a movable ring rolling over the said fixed ring, an arch pivoted to the said movable ring, a universal joint for supporting the gun on the said arch, hydraulic jacks for raising and lowering the said arch, a driving air cylinder supported by the said arch, an oil cylinder supported by the said arch, a piston in each of the said cylinders, a joint for uniting the said pistons, and distributing means operated by the vertical displacements of the gun relatively to the said arch for driving the said motor and for controlling the admission of the oil to the said jacks as well as the return of the said oil to the cylinder of the said pump.

ALBERT DEWANDRE.